United States Patent
Munson, Jr.

(10) Patent No.: US 7,461,510 B1
(45) Date of Patent: *Dec. 9, 2008

(54) GAS TURBINE ELECTRIC POWERPLANT

(75) Inventor: Bill C. Munson, Jr., Porthill, ID (US)

(73) Assignee: Altek Power Corporation, Kelowna, British Columbia (CA)

( * ) Notice: Subject to any disclaimer, the term of this patent is extended or adjusted under 35 U.S.C. 154(b) by 34 days.

This patent is subject to a terminal disclaimer.

(21) Appl. No.: 11/380,439

(22) Filed: Apr. 27, 2006

Related U.S. Application Data

(63) Continuation of application No. 10/123,123, filed on Apr. 16, 2002, now Pat. No. 7,036,318.

(51) Int. Cl.
*F02C 7/20* (2006.01)

(52) U.S. Cl. .......................... 60/796; 60/797

(58) Field of Classification Search ............. 60/796, 60/797, 806, 39.281
See application file for complete search history.

(56) References Cited

U.S. PATENT DOCUMENTS

| | | | |
|---|---|---|---|
| 2,443,054 A * | 6/1948 | Putz, et al. ............... 60/797 |
| 3,185,854 A * | 5/1965 | Hoffman ................. 290/52 |
| 3,791,682 A * | 2/1974 | Mitchell ................. 290/2 |
| 4,259,835 A | 4/1981 | Reed et al. |
| 4,267,692 A | 5/1981 | Earnest |
| 4,283,634 A | 8/1981 | Yannone et al. |
| 4,301,375 A | 11/1981 | Anderson |
| 4,308,463 A | 12/1981 | Giras et al. |
| 4,314,441 A | 2/1982 | Yannone et al. |
| 4,341,071 A | 7/1982 | Abo et al. |
| 4,431,369 A | 2/1984 | Lucas |
| 4,504,190 A | 3/1985 | Beeloo |
| 4,506,503 A | 3/1985 | Ogborne et al. |
| 4,537,024 A | 8/1985 | Grosjean |
| 4,718,229 A * | 1/1988 | Riley ................. 60/39.281 |
| 5,185,693 A | 2/1993 | Loftis et al. |
| 5,237,816 A | 8/1993 | Duffy et al. |
| 5,333,458 A | 8/1994 | Loving |
| 5,372,005 A | 12/1994 | Lawler |
| 5,408,957 A | 4/1995 | Crowley |
| 5,419,112 A | 5/1995 | Farrell |
| 5,678,408 A | 10/1997 | Janes |
| 5,709,076 A * | 1/1998 | Lawlor ................. 60/39.35 |
| 5,896,741 A | 4/1999 | Etheridge |
| 6,088,630 A | 7/2000 | Cawlfield |
| 6,148,617 A | 11/2000 | Williams |

(Continued)

*Primary Examiner*—William H Rodriguez
(74) *Attorney, Agent, or Firm*—Standly Law Group LLP

(57) ABSTRACT

A gas turbine electric powerplant, preferably driven by an aeroderivative turbine engine of split shaft design. The gas turbine engine is coupled to a speed reducer, which is in turn coupled to an electric generator. An engine mount is provided that ensures that the gas turbine engine will remain in proper alignment with the speed reducer and generator, even during the thermal expansion or contraction thereof. Preferably, the components comprising the powerplant are mounted to a common, transportable base, so that the powerplant can be delivered to various locations. An overspeed control system is provided for ensuring that a runaway condition of the gas turbine engine does not occur should the gas turbine engine become disconnected from the speed reducer or generator. Sensors are used to monitor multiple operating conditions of the powerplant. A microprocessor-based control system communicates with the sensors, and is further adapted to activate the overspeed control system if an overspeed condition is detected.

22 Claims, 12 Drawing Sheets

U.S. PATENT DOCUMENTS

| | | |
|---|---|---|
| 6,230,481 B1 * | 5/2001 | Jahr .............................. 60/796 |
| 6,279,309 B1 * | 8/2001 | Lawlor et al. ................. 60/772 |
| 6,446,425 B1 * | 9/2002 | Lawlor ......................... 60/768 |
| 6,449,957 B1 | 9/2002 | Takamatsu et al. |
| 6,708,500 B2 * | 3/2004 | Huster et al. .................. 60/797 |
| 6,786,051 B2 | 9/2004 | Kristich et al. |
| 6,789,000 B1 * | 9/2004 | Munson, Jr. ................. 700/287 |
| 6,826,914 B2 * | 12/2004 | Huster et al. .................. 60/797 |
| 6,871,504 B2 * | 3/2005 | Kuroki et al. ................. 60/797 |
| 6,941,217 B1 * | 9/2005 | Munson, Jr. ................. 701/100 |
| 7,036,318 B1 | 5/2006 | Munson |
| 7,043,924 B2 * | 5/2006 | Kuroki et al. ................. 60/796 |
| 7,143,585 B2 * | 12/2006 | Kuroki et al. ................. 60/797 |
| 2006/0225403 A1 * | 10/2006 | Tsuzuki et al. ........... 60/39.281 |

* cited by examiner

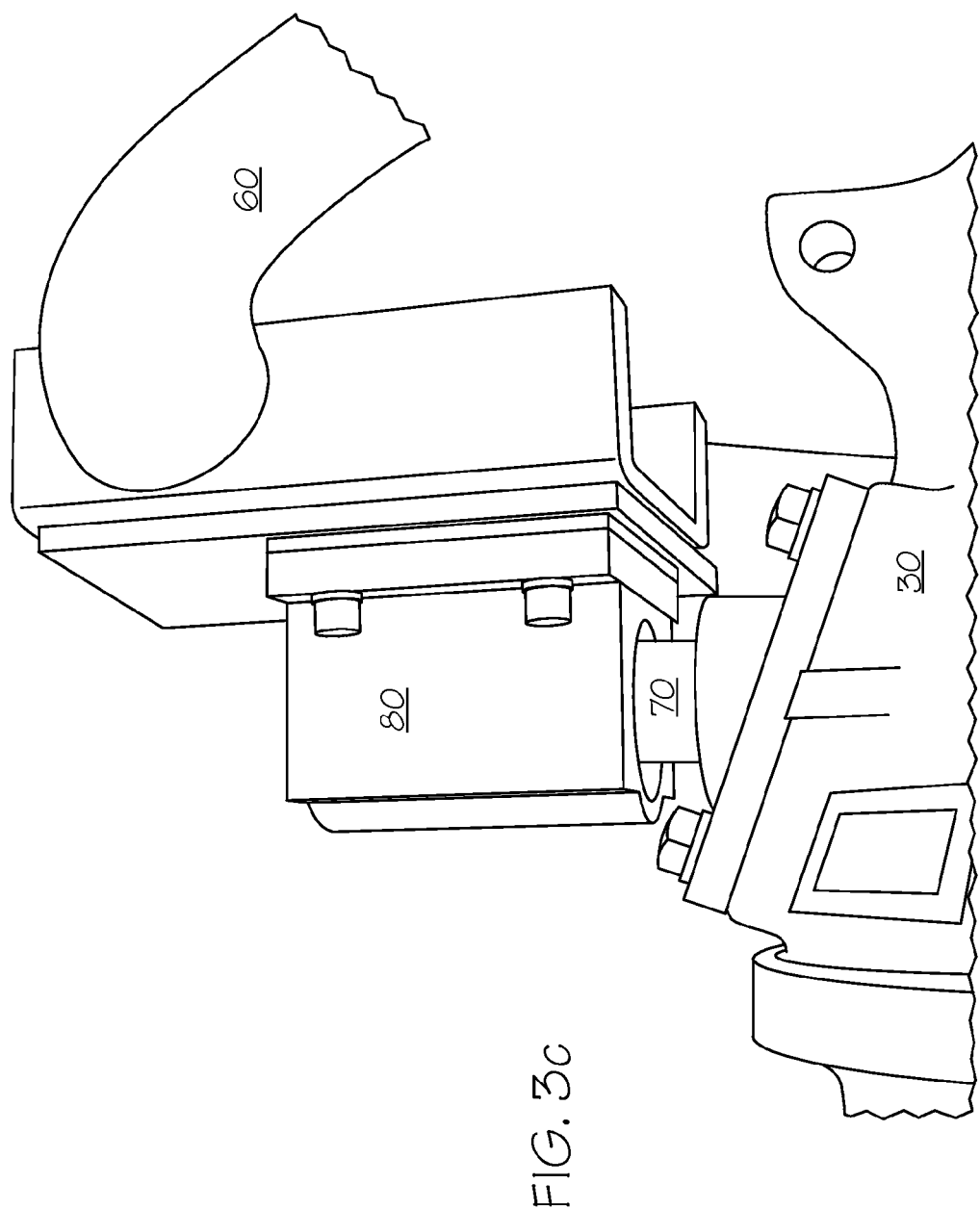

GAS TURBINE ELECTRIC POWERPLANT

This application is a continuation of U.S. patent application Ser. No. 10,123,123, filed on Apr. 16, 2002.

BACKGROUND OF THE INVENTION

The present invention relates to a gas turbine electric powerplant. The gas turbine electric powerplant uses a turbine engine, such as an aircraft engine, to operate an electric generator that produces electric power. The gas turbine electric powerplant can be portable, and may be easily transported to virtually any location where electric power generation is needed. The gas turbine electric powerplant is also adapted to allow safe, unattended operation.

There are numerous situations wherein it may be desirable to use a gas turbine electric powerplant of the present invention. For example, it may be necessary to provide electric power to a remote area that is not supplied by a utility company. Electric power consuming operations that are commonly conducted in remote areas include, for example, drilling for oil and natural gas. Such operations may require more power than can be supplied by typical gas or diesel generators. When such an operation is too remote to receive power from a utility, the gas turbine electric powerplant of the present invention may be used to supply electric power to the operation. Similarly, the gas turbine electric powerplant of the present invention can be used when electric power production is required on only a temporary basis. For example, in the above-described remote drilling operation, utility power may be available, but connection costs may be prohibitive based on the short period of time during which electric power will be required. Such a situation may also occur during large-scale, remote construction projects.

The gas turbine electric powerplant of the present invention may also be used to provide backup power during interruption of electric power supplied from a utility or other source. The gas turbine electric powerplant of the present invention may be brought online in as little as 30-60 seconds, thereby preventing long periods of down time. Use of the gas turbine electric powerplant for backup power may be highly effective for commercial buildings, manufacturing facilities, hospitals, or other locations wherein a long term interruption of electric power is particularly problematic.

One or more of the gas turbine electric powerplants of the present invention may also be used in a variety of ways by a producer of electric power. For example, an electric utility may utilize one or more of the gas turbine electric powerplants to provide load-leveling or peak shaving during periods of high demand for electric power. Utilities commonly struggle with the problem of meeting peak demand, which occurs typically at particular times of the day, and is usually more severe during certain times of the year. Peak demand is the result of consumers using more electricity at particular times of the day than at others; for example, during the waking hours as opposed to during the nighttime hours.

To meet peak demand, a utility's power generating plants must typically be overdesigned—meaning that they only run near peak efficiency during periods of high demand. Therefore, for the majority of a given day, the power plant runs at a reduced output and, unfortunately, a lower efficiency.

SUMMARY OF THE INVENTION

By employing the gas turbine electric powerplant of the present invention, utility power generating plants could be designed to meet only average demand while running at optimum efficiency. One or more of the gas turbine electric powerplants of the present invention could then be tied to the utility's power distribution and transmission grid, and when peak demands arise, the gas turbine electric powerplants can be operated to inject additional electric power into the grid.

The control system of the gas turbine electric powerplant of the present invention can provide for automatic start-up and operation when high demand is detected. When the demand ebbs, the gas turbine electric powerplants can be shut down as needed. The portability of the gas turbine electric powerplant of the present invention also allows additional units to be set up at a utility if needed to meet increasing peak demand. Such a situation may occur when a particular area or areas served by a utility grows at a faster than expected rate. In this manner, both the cost of building a power generating plant and the cost of producing electricity may be reduced, while still ensuring that peak demand can be met.

The gas turbine electric powerplant of the present invention can also be used as a source of co-generation electric power. For example, the gas turbine electric powerplant may be installed at an industrial facility and tied into the facility's electric power transmission and distribution system in order to augment the electric power supplied by an electric utility company. The cost to purchase electric power from a utility may vary throughout a given day or week. For example, it is common for large industrial facilities to be limited in the amount of power they may use, or to otherwise be charged a significantly elevated price during periods of high demand. Such may occur, for example, during periods of extreme weather, when the general consumption of electric power typically increases. When such a situation exists, the industrial facility may operate one or more of the gas turbine electric powerplants to supplement the electric power it receives from the utility. In this manner, the industrial facility can avoid having to either reduce its power consumption or pay a higher cost for electric power during such periods.

The gas turbine electric powerplant of the present invention can also be used as a source of distributed power generation. As certain populated areas grow, the demand for electric power generally increases. Many times, the provider of electric power does not have the capacity to meet the increased demand. Electric utilities often form cooperatives, or otherwise enter into agreements wherein electric power may be sold and delivered between the utilities. Thus, if one utility cannot meet demand, and a second utility has excess capacity, the second utility may sell blocks of power to the first utility. The first utility may be at a disadvantage, because the cost to purchase and transfer the electric power to the area of demand may be high. The second utility is able to take advantage of its excess capacity by selling and distributing the electricity to other providers. The gas turbine electric powerplant of the present invention can be used to take advantage of growing markets, by allowing a provider to produce additional electric power that may be sold to other providers without sufficient capacity. Alternatively, the gas turbine electric powerplant of the present invention may be used by a provider to obviate the need for purchasing additional electric power from another utility. Rather, the provider may use the gas turbine electric powerplant to produce incremental electric power in small blocks, minimizing large incremental power block purchases from other utilities. The gas turbine electric powerplant can be located to provide electric power wherever it is needed. For example, the gas turbine electric powerplant may be placed at a distribution substation and tied into a utility's transmission and distribution lines.

The gas turbine electric powerplant of the present invention uses a gas turbine engine to run an electric generator. More specifically, the gas turbine electric powerplant uses an aeroderivative gas turbine engine, such as is designed for a helicopter. The turbine engine may be purchased new, or may be removed from an aircraft and retrofitted for use in the gas turbine electric powerplant. Although a variety of turbine engines may be employed, preferably the turbine engine is a turboshaft engine. Gas turbine engines may produce in excess of 1,000 horsepower and significant torque. As such, turboshaft engines are preferred, because it has been found that turboshaft engines are easier to harness than are turbo thrust and other types of gas turbine engines.

A gearbox is preferably used to reduce the output speed of the turbine engine to a predetermined value. While the turbine engine may have an internal gear reduction, an external gearbox is typically required to obtain the proper input speed to the generator. While it may be possible to use a gearbox with a fixed speed reduction, preferably a gearbox with a variable output speed is used. The input of the gearbox is connected to the output shaft of the turbine engine by a specialized coupling.

The output shaft of the gearbox is connected to the input shaft of an electric power generator, such as a permanent magnet generator, by a specialized coupling. Rotation of the generator's input shaft and windings produces electric power that can be output to a specific load or into the power grid of an electric utility. The generator can be selected to provide the desired voltage and power output. For example, in one embodiment, the generator may produce up to 1.2 MW of power at 480 volts.

Multiple control systems are provided to control the operation of the gas turbine electric powerplant and to provide automatic shutdown if the turbine engine becomes disconnected from the gearbox or generator. The main control system is a microprocessor based system that is able to monitor a multitude of gas turbine electric powerplant conditions, such as fuel flow, various temperatures, turbine speed, and many other conditions. The control system preferably provides for real time control and trend capabilities, based on the monitored conditions and on user settings. Additional control systems are provided to ensure that the turbine can be slowed should a no-load (runaway) situation occur.

The gas turbine electric powerplant is designed to operate on both liquid and gaseous fuels that can provide a sufficient BTU output. Specific microprocessor-controlled fuel valves are provided based on the type of fuel that will be used to run the gas turbine electric powerplant. The fuel valves may be changed if it is desired to change the type of fuel used with the gas turbine electric powerplant. The microprocessor-based design of each type of fuel valve allows the valve to communicate with and respond to instructions from the microprocessor-based control system.

The assembled components of the gas turbine electric powerplant reside on a common base, preferably on a transportable skid. A specialized frame is mounted to the skid and designed to receive and restrain the turbine engine. The frame is designed to maintain the centerline of the turbine engine despite the thermal expansion thereof. The size and weight of the gas turbine electric powerplant components and skid allow it to be transported by truck to virtually any site where electric power is needed. Therefore, the gas turbine electric powerplant of the present invention provides for a portable source of significant electric power production that may be utilized to meet a number of consumer needs.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 3c is an enlarged left side elevational view showing the assembled relationship of particular bearing mounting system elements depicted in FIGS. 3a and 3b;

DETAILED DESCRIPTION OF THE EXEMPLARY EMBODIMENT(S)

Figure 1:
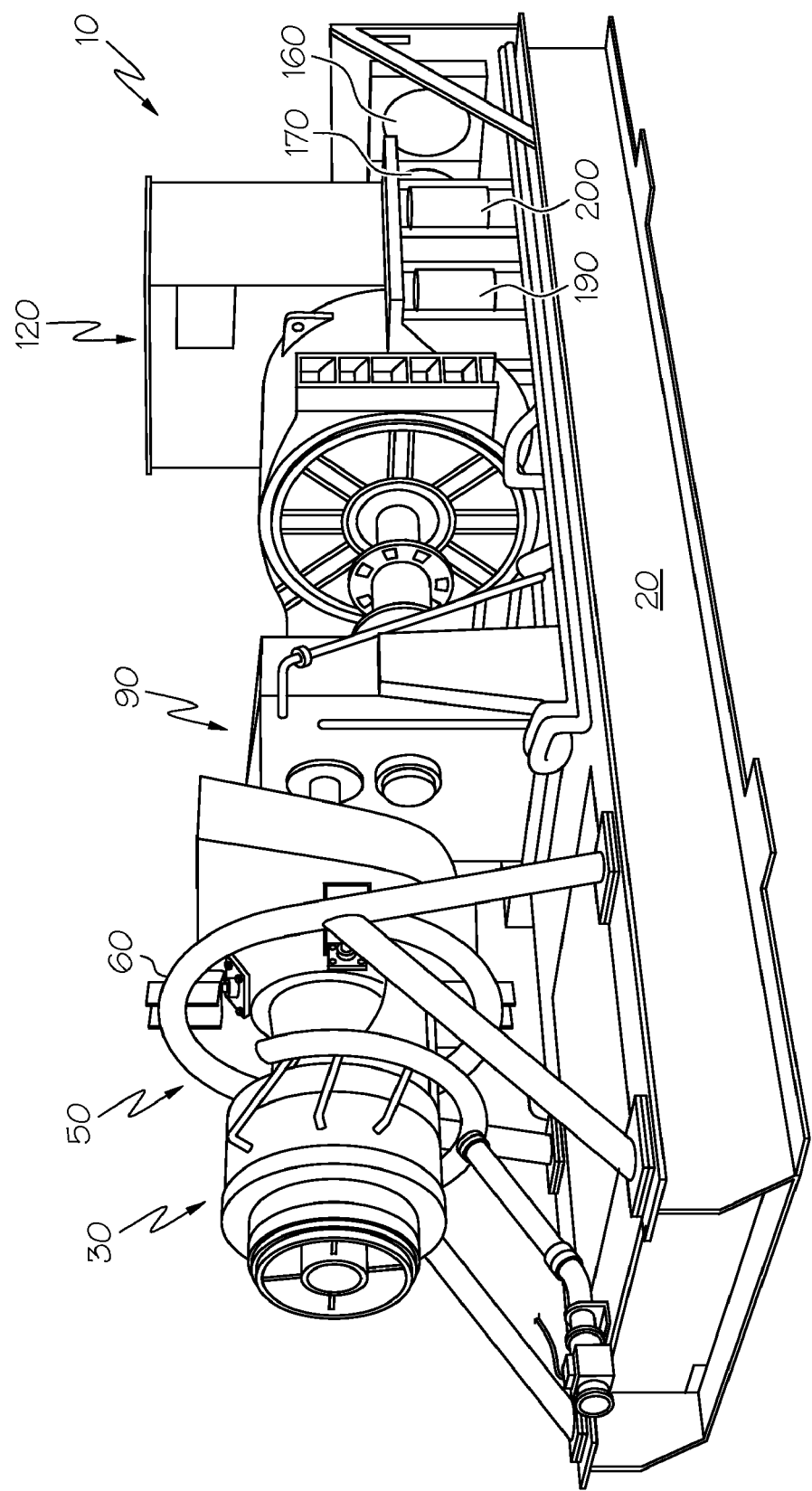
FIG. 1 is an isometric view of one embodiment of a gas turbine powerplant of the present invention.

An isometric view of one embodiment of a gas turbine electric powerplant 10 of the present invention can be observed in FIG. 1. The gas turbine electric powerplant 10 preferably resides on a unitary base, such as the skid 20 shown. In this manner, the entire gas turbine electric powerplant 10 can be easily and conveniently transported to virtually any location requiring electric power production. It is also possible, however, to assemble the gas turbine electric powerplant 10 onto a fixed mounting surface, such as, for example, the floor of a factory.

Figure 2:
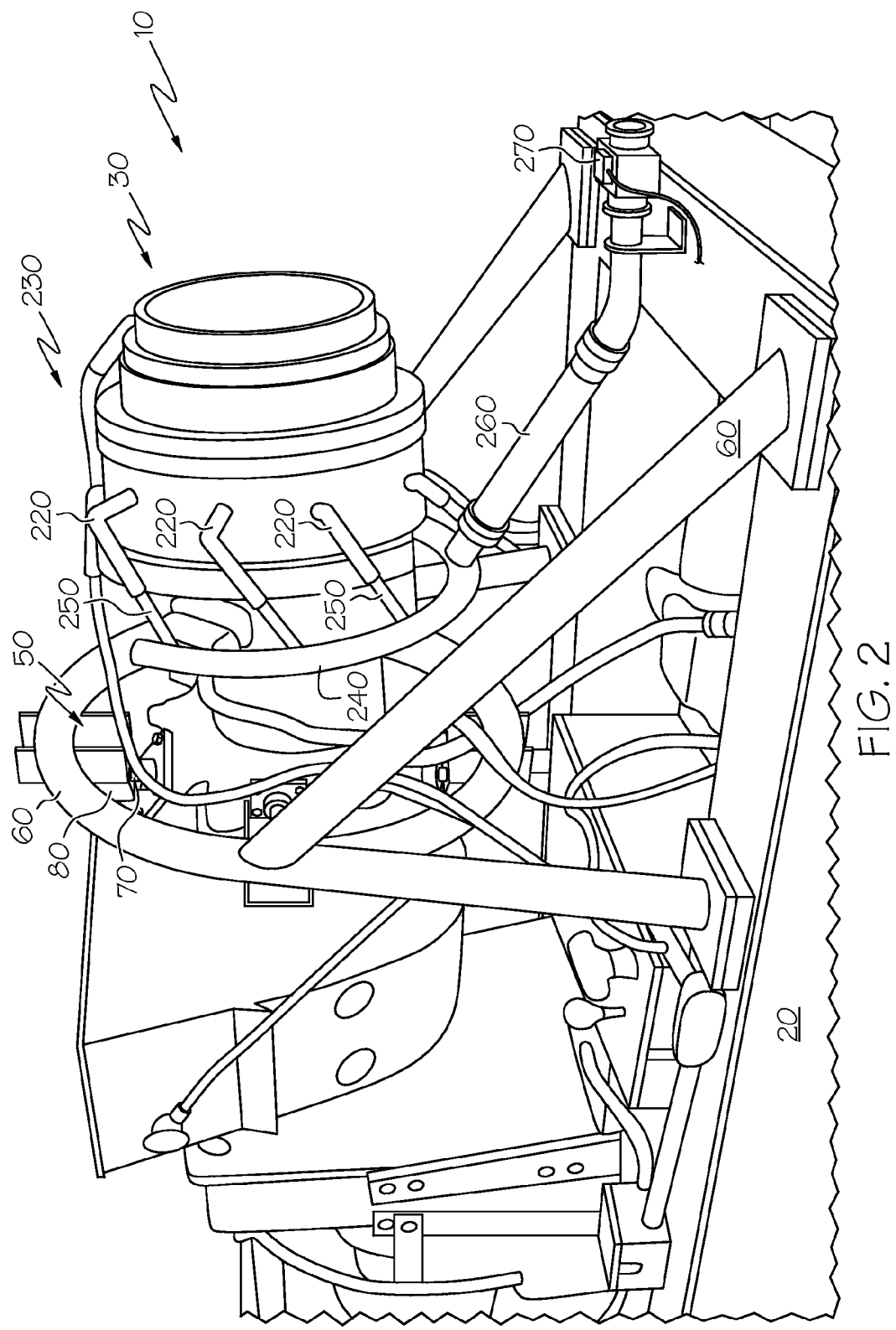
FIG. 2 is an enlarged, isometric view of the gas turbine engine and engine mounting structure of the gas turbine electric powerplant of FIG. 1.

The gas turbine electric powerplant 10 is shown to be powered by a turbine engine 30, which can be better observed by reference to FIG. 2. The turbine engine 30 may be aero-derivative, such as is intended for use in a helicopter or other aircraft. Preferably, the turbine engine 30 is a turboshaft engine, wherein an output shaft connected to a turbine within the engine is provided for coupling to an external device. The use of a turboshaft-type turbine engine 30 is preferred over other types of turbine engine designs because the turboshaft engine exhibits very little residual thrust, and is, therefore, easier to harness. Various turboshaft engines may be employed to drive the gas turbine electric powerplant 10 of the present invention. For example, suitable turboshaft engines may be obtained from ASE, Avco/Lycoming, Honeywell (Allied Signal), Pratt&Whitney, Rolls Royce, Turbomecca, and other similar manufacturers. In this particular embodiment of the present invention, the turbine engine 30 is a T-53 series turboshaft engine manufactured by (Allied Signal) Avco/Lycoming (now Honeywell), headquartered in Phoenix, Ariz. The T-53 turboshaft engine is designed primarily for powering helicopters, and has proven highly reliable over many years of operation. In this particular embodiment, the turbine engine 30 produces in excess of 1,400 shaft horsepower, at output shaft rotational speeds of up to approximately 21,000 revolutions per minute. This particular turbine engine 30 is also of split shaft (free power) design; meaning that there is a gas-generator turbine connected by a first shaft to a compressor, and also a power turbine having a separate output shaft.

Because of the high rotational speeds and torque output that is generated by the turbine engine 30, a specialized bearing mounting system 50 is used to secure the turbine engine 30 to the skid 20 or other mounting surface. The bearing mounting 50 system can best be seen in FIGS. 2 and 3. It is important that all the components of the gas turbine electric powerplant 10 remain in alignment during operation. Specifically, if there is a deviation in the centerline position between the output shaft of the turbine engine 30 and the input and output shafts of the downstream components to which it is connected, the life cycle of the gas turbine electric powerplant components may be significantly shortened or, more catastrophically, the gas turbine electric powerplant 10 may be destroyed.

Maintaining component alignment is difficult, however, particularly with respect to the gas turbine engine 30. During start-up and operation of the gas turbine electric powerplant 10, the temperature of the turbine engine 30 will increase from an initial temperature to some higher operating temperature. Because the turbine engine 30 generally operates at elevated temperatures, thermal expansion will typically cause its dimensions to increase in one or more directions. Thus, if the turbine engine 30 is rigidly secured to a base, such as the skid 20, there will be a tendency for the centerline of its output shaft 40 to deviate. To maintain the centerline position of the turbine engine output shaft 40, a specialized bearing mount system 50 is preferably used, wherein the turbine engine 30 is effectively allowed to float within a solid mounting frame 60 that is securely fastened to the skid 20 or other mounting surface. The bearing mount system 50 permits thermal expansion of the turbine engine 30, while at the same time maintaining the position of the output shaft 40 centerline. The bearing mount system 50 also assists in reducing vibrations within the gas turbine electric powerplant 10 that can result from the rotational motion of the turbine engine 30.

Figure 3A:
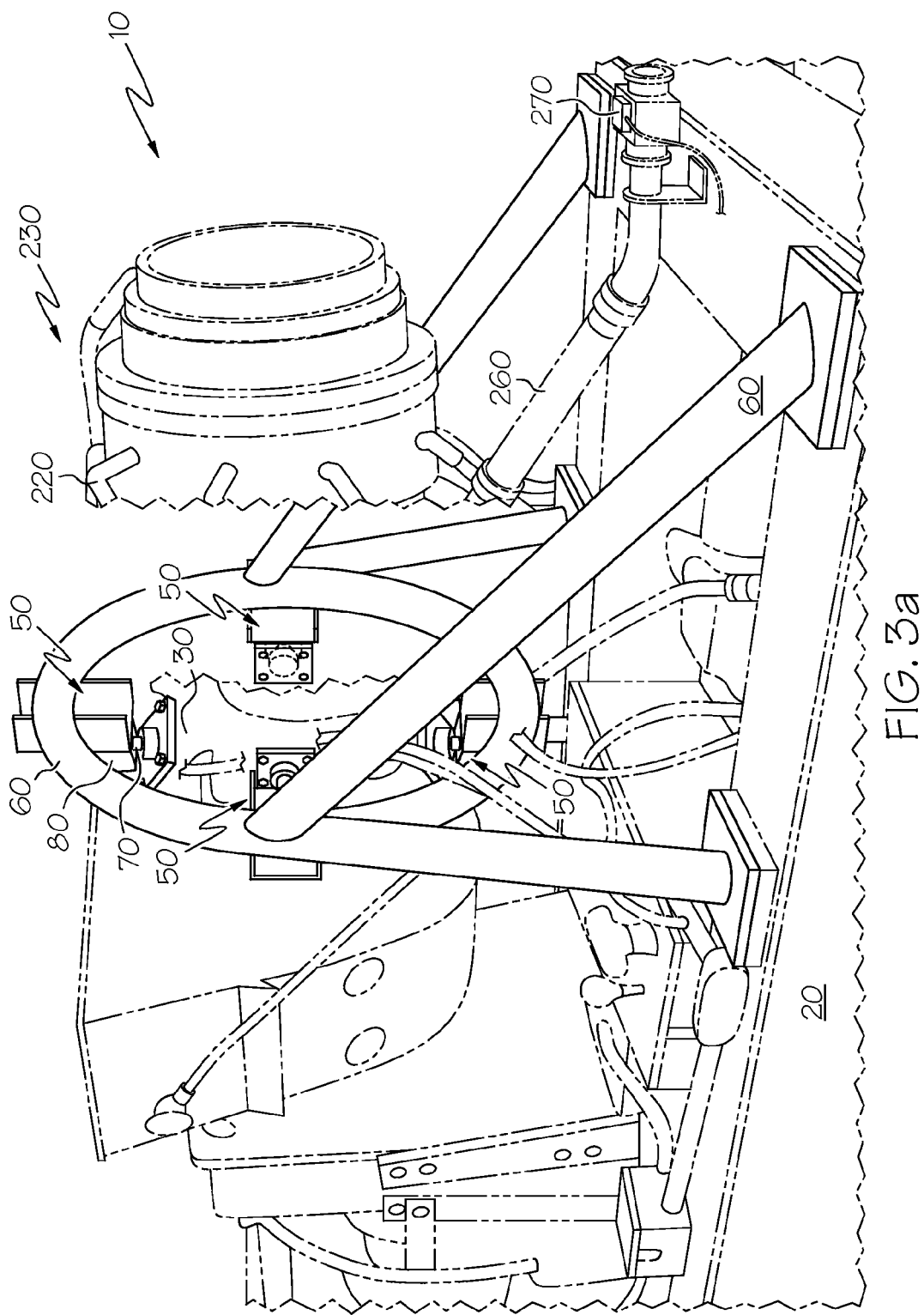
FIG. 3a is an enlarged isometric view of a bearing mounting system used to mount the gas turbine engine as shown in FIGS. 1 and 2, wherein portions of certain gas turbine electric powerplant components have been removed for purposes of clarity.
Figure 3B:
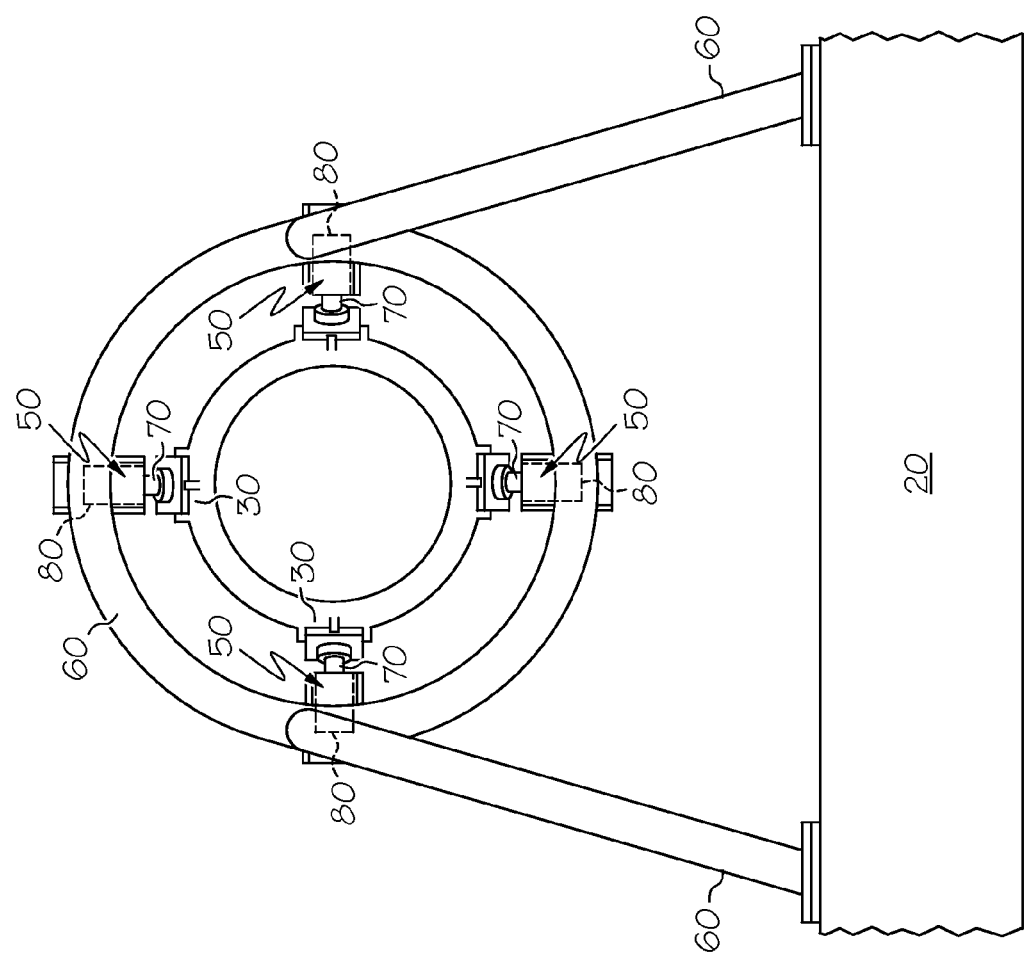
FIG. 3b is a front elevational view of the bearing mounting system of FIG. 3a, wherein certain gas turbine electric powerplant components have been removed for purposes of clarity.

Referring specifically to FIG. 3, it can be seen that in this particular gas turbine electric powerplant 10, the bearing mount system 50 utilizes a series of mounting shafts 70 that are secured at substantially uniformly spaced intervals around the outer circumference of the turbine engine 30. Each of the mounting shafts 70 is received by a corresponding linear bearing 80 located on the mounting frame 60. Although numerous types and numbers of linear bearings and mounting shafts may be successfully employed, in this particular embodiment of the gas turbine electric powerplant 10, each of three circumferentially-located mounting shafts 70 are caused to mate with a corresponding Pillow Block linear bearing 80, manufactured by Thomson Industries, Inc. in Port Washington, N.Y.

Figure 4:
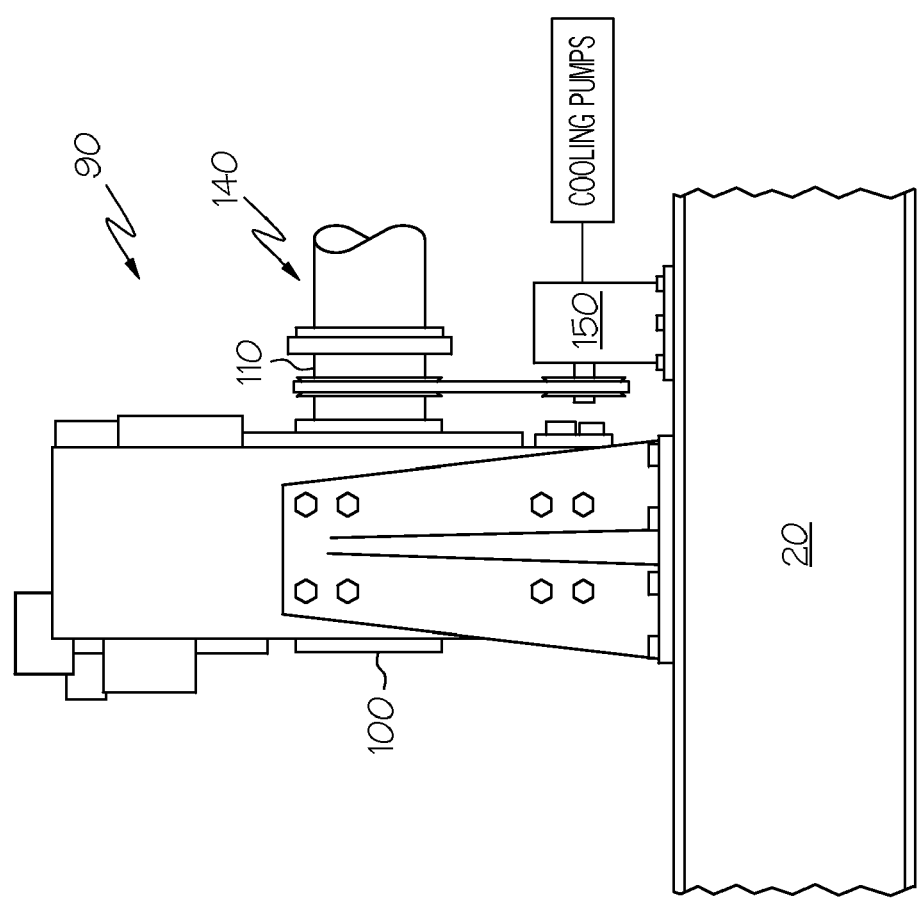
FIG. 4 is an enlarged, right side elevational view of a gearbox (speed reducer) of the gas turbine electric powerplant of FIG. 1, wherein an alternator assembly is shown to be connected by a belt and pulley to an output shaft of the gearbox.

The output shaft 40 of the turbine engine 30 is coupled to the input portion 100 of a speed reducing gearbox 90 to obtain a desired final output shaft speed for driving a generator. An enlarged view of the gearbox is shown in FIG. 4. The final output shaft speed may vary depending on the particular generator that is driven by the turbine engine 30. In this particular embodiment of the gas turbine electric powerplant 10, the final output shaft speed is selected to be approximately 1,800 revolutions per minute when driven at the substantially normal operating speed of the turbine engine 30. While numerous gearboxes may be used to accomplish the necessary speed reduction, the gearbox 90 used in this particular embodiment of the gas turbine electric powerplant 10 is manufactured by the Cotta Transmission Company, in Beloit, Wis. The Cotta gearbox 90 is actually designed to provide a speed increase, but is operated in reverse in this case to provide the necessary speed reduction. It is also possible to couple a variable speed gearbox to the output shaft of the turbine engine 30, whereby variable speed reductions thereof may be achieved.

While numerous gearboxes may be used to accomplish the necessary speed reduction, the gearbox 90 used in this particular embodiment of the gas turbine electric powerplant 10 is manufactured by the Cotta Transmission Company, in Beloit, Wis. The Cotta gearbox 90 is actually designed to provide a speed increase, but is operated in reverse in this case to provide the necessary speed reduction. It is also possible to couple a variable speed gearbox to the output shaft of the turbine engine 30, whereby variable speed reductions thereof may be achieved.

Figure 5:
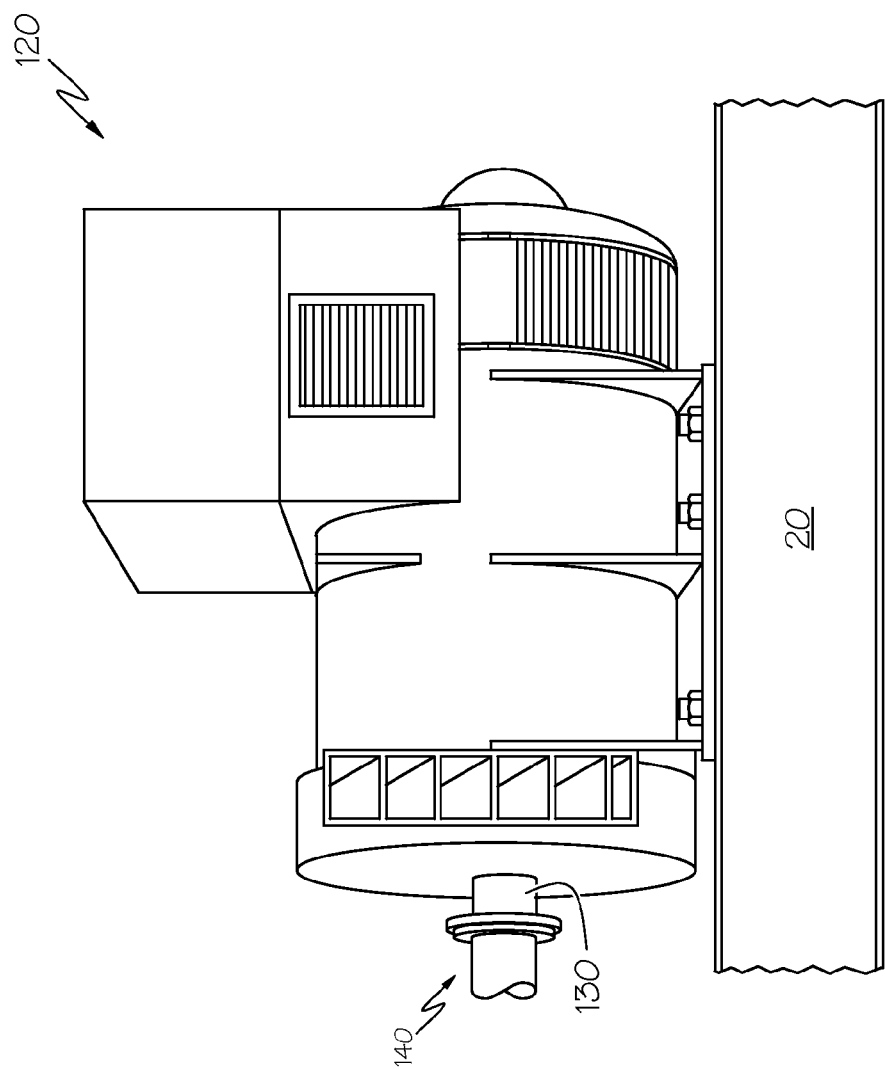
FIG. 5 is an enlarged, right side elevational view of the electric power generator of the gas turbine electric powerplant of FIG. 1.
Figure 6A:
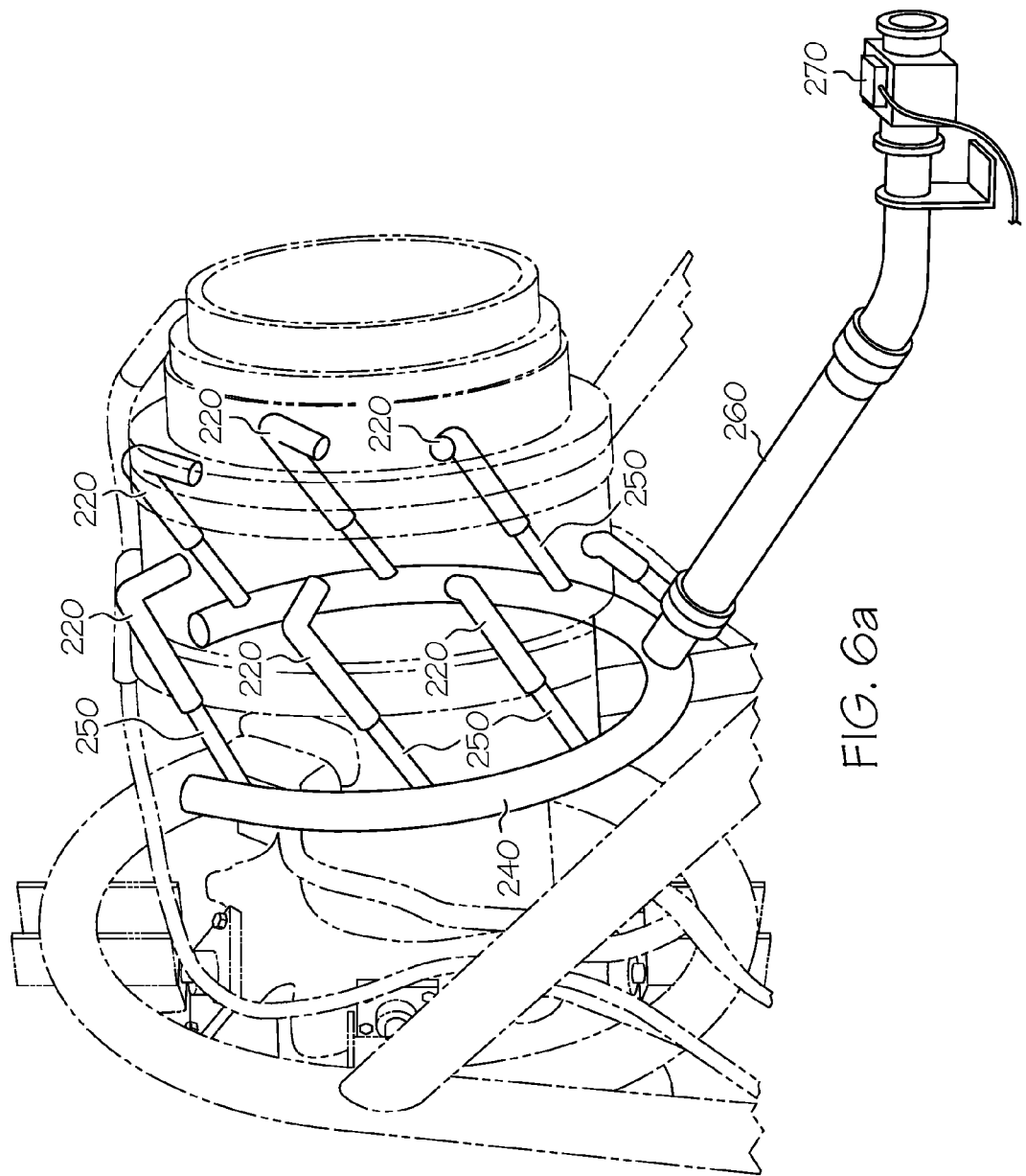
FIG. 6a is an enlarged isometric view of a compression relief system in communication with the gas turbine engine of FIG. 1, wherein portions of certain gas turbine electric powerplant components have been removed for purposes of clarity.
Figure 6B:
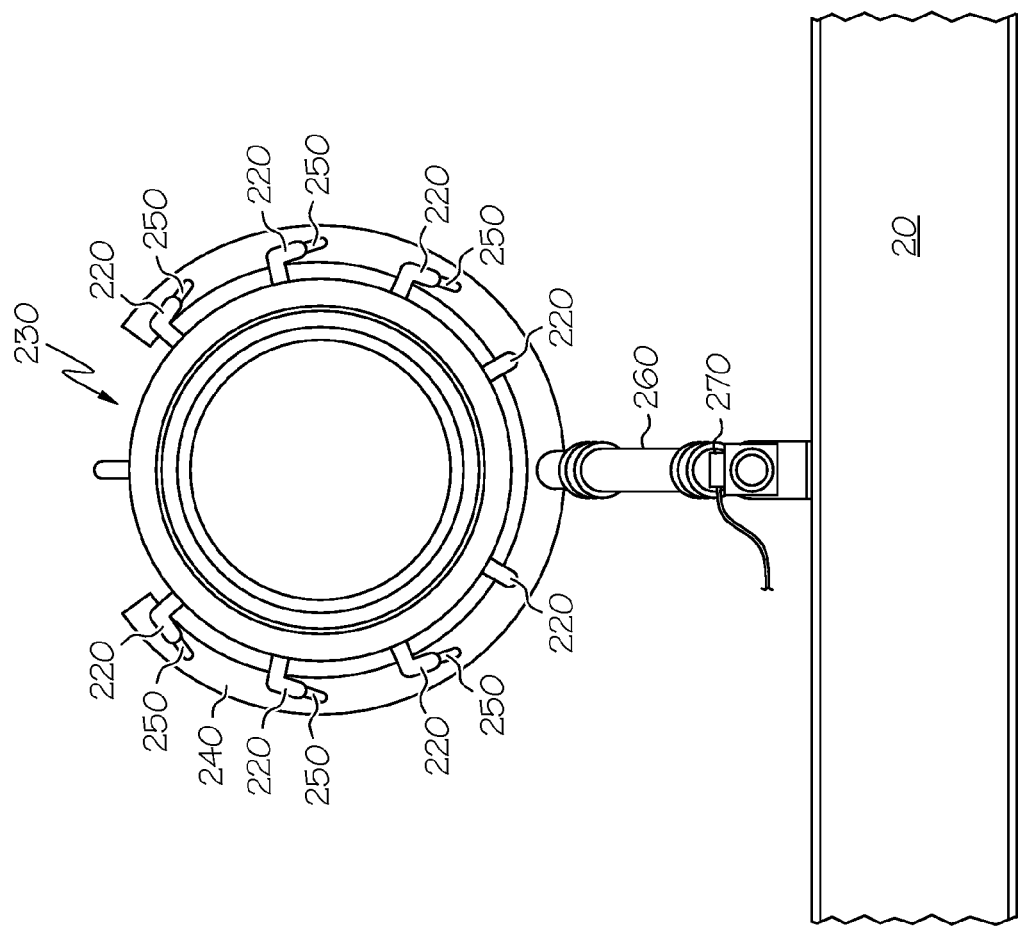
FIG. 6b is a front elevational view of the compression relief system of FIG. 6a, wherein certain gas turbine electric powerplant components have been removed for purposes of clarity.
Figure 7A:
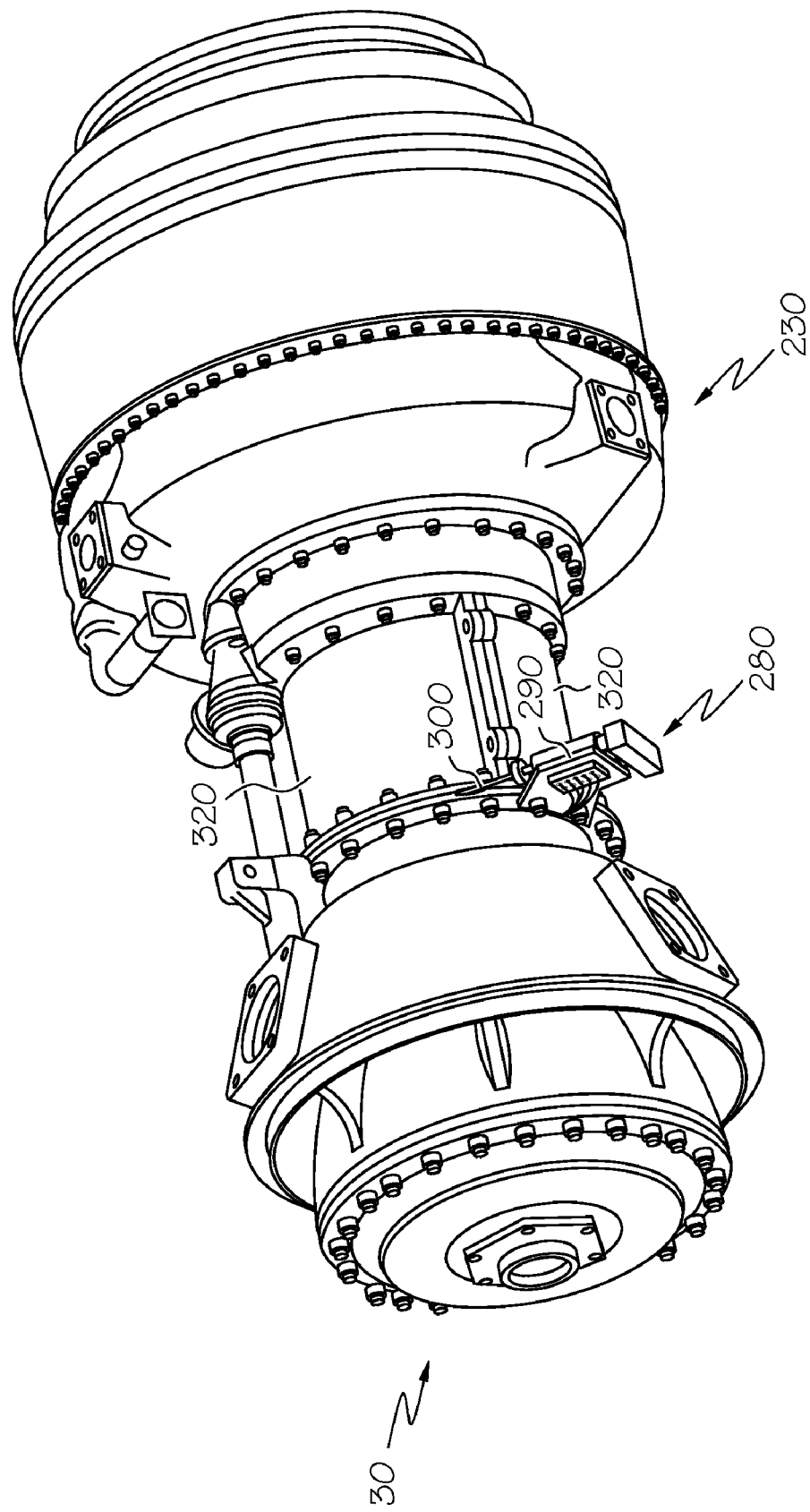
FIG. 7a is an enlarged isometric view showing an actuator portion of an air directing system affixed to the gas turbine engine of FIG. 1 wherein certain gas turbine electric powerplant components have been removed for purposes of clarity.
Figure 7B:
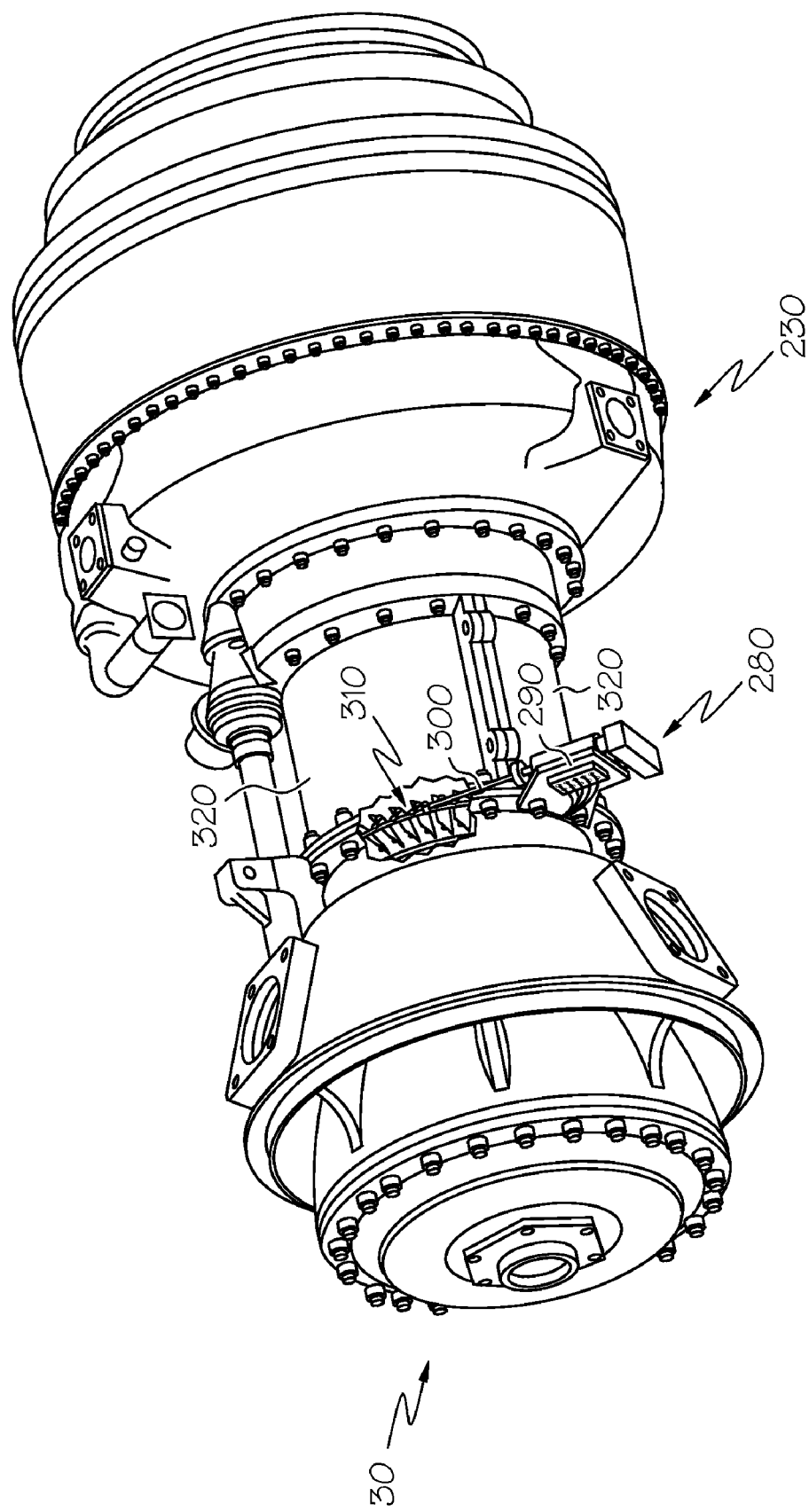
FIG. 7b is an enlarged isometric view in partial cutaway, illustrating that a portion of the air directing system of FIG. 7a is in communication with a set of inlet guide vanes within the gas turbine engine.
Figure 8:
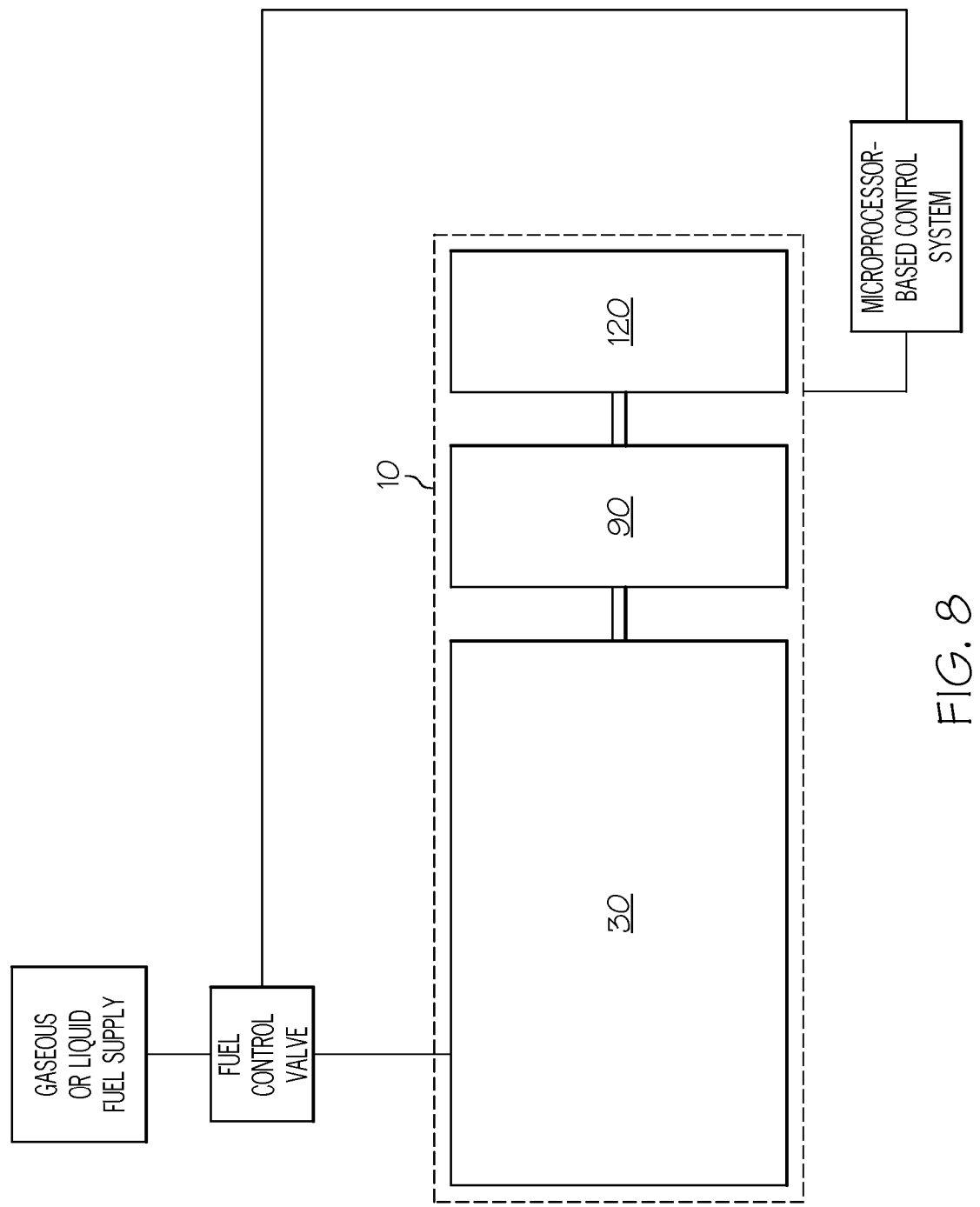
FIG. 8 is a block diagram representing an exemplary embodiment of a gas turbine electric powerplant of the present invention.

An output shaft 110 of the gearbox 90 is connected to the input shaft 130 of an electric power generator 120 by a specialized coupling 140. Various generators may be employed by the gas turbine electric powerplant 10 to provide electric power. In the particular embodiment of the gas turbine electric powerplant 10 described herein and illustrated in the drawing figures, the generator 120 is a permanent magnet generator manufactured by Newage Stamford, International (now Newage AVK SEG) in Lincolnshire, England. An enlarged view of the generator 120 is shown in FIG. 5. The generator 120 provides a 3-phase, 480 volt output at 50-60 Hz, and is capable of producing approximately 1.2 MW of power at 1,800 revolutions per minute. However, the specific operating parameters of the generator can be selected based on the particular application to which the gas turbine electric powerplant 10 will be applied, and it is not to be construed that the manufacturer, model, or output of the generator is limited to the exemplary embodiment described herein.

In this embodiment, the generator 120 uses a self-excited voltage regulator to supply power to a main exciter, thereby creating a source of constant excitation power that is independent of generator output (the excitation field remains at full strength). The generator 120 is further provided with built in voltage protection, as well as protection against over-excitation.

A cooling system is provided to treat various components of the gas turbine electric powerplant 10 during operation. In this embodiment, the cooling system consists of two separate, closed cooling loops, each with its own cooling fluid pumps. The pumps can operate on AC power, DC power, or both. In this particular embodiment of the gas turbine electric powerplant 10, the cooling fluid pumps operate on 24Vdc power from an alternator 150. The alternator is driven by a belt that is connected to a pulley mounted to the output shaft 110 of the speed reducing gearbox 90. One cooling loop provides cooling to the gearbox 90. The other cooling loop provides inlet pressure and the cooling necessary for continuous operation of the turbine engine 30. The cooling pumps draw cooling fluid from a cooling fluid reservoir for circulation to the gearbox 90 and gas turbine engine 30. The cooling fluid in each cooling loop is preferably also circulated through a heat exchanger 160, 170 that is associated with each cooling loop. Each heat exchanger 160, 170 may also be provided with one or more cooling fans to provide increased cooling of the cooling fluid when necessary. Preferably, cooling system temperatures are monitored by the gas turbine electric powerplant's control system software. If the temperature of the cooling fluid exceeds a predetermined value, the control software activates one or more of the cooling fans mounted to the heat exchangers 160, 170. Each cooling loop is also preferably served by a pre-lubrication and post-lubrication system. The pre-lubrication and post-lubrication systems are preferably rated for continuous duty so they can serve as emergency systems in the event of primary pump failure. At least one cooling fluid filter is also preferably provided to clean the cooling fluid used with the cooling system. In this particular embodiment of the gas turbine electric powerplant 10, two oil filters 190, 200 are utilized for this purpose. The oil filters 190, 200 are preferably located within the cooling loops, so that by temporarily deactivating the cooling pumps one or both of the oil filters may be changed without shutting down the turbine engine 30. It has been found that use of a Number 603M oil filter from the Norman Filter Company in Bridgeview, Ill., provides for good results. Other oil filters may also be successfully used.

The gas turbine electric powerplant 10 is designed to operate effectively on a number of different fuels of both a liquid and gaseous variety. Preferably, however, the fuel is able to provide a thermal energy output of at least 600 BTU per cubic foot. Examples of acceptable liquid fuels include, among others, gasoline, diesel fuel, jet fuel, kerosene, and isopropyl alcohol. Acceptable gaseous fuels may include, among others, hydrogen, natural gas, propane, butane, and isopropane. The particular gas turbine electric powerplant 10 described in detail herein is adapted to operate on natural gas. The selected fuel is supplied from the fuel source to the turbine engine via a microprocessor-controlled fuel metering valve (not shown). The fuel metering valves employed with the particular embodiment of the gas turbine electric powerplant 10 described herein are manufactured by Continental Controls Corporation in San Diego, Calif. Other fuel valves may also be used.

When a liquid fuel is used to power the turbine engine 30, a liquid fuel valve is employed to meter the fuel supply. The liquid fuel valve preferably has an integrated microprocessor that allows the valve to exhibit fast response times. The valve preferably also features a built-in flow meter that outputs fuel flow as a standard analog signal, and a flow-through design to minimize the effect of contaminates. The liquid fuel metering valve is in electronic communication with the gas turbine electric powerplant's control software. The microprocessor integrated within the valve compares the demand signal being sent to the valve with the fuel flow signal from the built-in flow meter. The microprocessor then makes adjustments to the orifice in order to equalize the fuel demand with the fuel flow.

In conjunction with the gas turbine electric powerplant's control software, changes in demand may be anticipated by the integrated microprocessor. When a gaseous fuel is used to power the turbine engine 30, a gaseous fuel valve is installed on the gas turbine electric powerplant 10. Like the liquid fuel valve, the gaseous fuel valve preferably makes use of an integrated microprocessor based electronic controller. The valve preferably features a main poppet valve that is controlled by internal gas pressure. A standard analog signal corresponding to an input fuel demand that is proportional to measured fuel flow is output by the valve. The inputs are then compared by the gas turbine electric powerplant's control software, with appropriate adjustments made to the fuel flow to maintain operating stability.

Based on the many uses for a gas turbine electric powerplant 10 of the present invention, it is desirous that the gas turbine electric powerplant be able to run in an unattended condition. To this end, it is necessary to ensure the automatic and safe shutdown of the turbine engine 30 should the turbine engine become disconnected from the gearbox or generator. If the turbine engine 30 becomes disconnected from the gearbox or generator 120, or the load imparted by the gearbox or generator is somehow removed, and operation of the turbine engine 30 is allowed to continue without intervention, the rotational speed of the turbine engine will likely increase beyond a safe limit. This condition is often referred to as an "overspeed" condition or as a "runaway" condition. An overspeed condition can lead to the failure of the gas turbine engine 30, or more seriously, to the break up of the gas turbine engine. Therefore, runaway of the gas turbine engine 30 must be prevented for both operational and safety reasons. To this end, the gas turbine electric powerplant 10 of the present invention employs multiple systems for controlling an overspeed condition and causing the safe shutdown of the turbine engine 30—even when an operating gas turbine electric powerplant is left unattended. More specifically, the gas turbine electric powerplant 10 utilizes a combination of a unique overspeed air dump (compression relief) system 210, a novel air directing system 280, and the gas turbine electric powerplant's customized control software, to detect an overspeed condition and control the gas turbine engine 30 accordingly.

The compression relief system 210 employed by the gas turbine electric powerplant 10 of the present invention, acts to remove operating air from the turbine engine 30 if an overspeed condition is detected. In this particular embodiment of the present invention, using the T-53 series turboshaft engine 30, compression relief outlets 220 are preferably located around the periphery of the turbine engine 30 to communicate with the inlet portion of the turbine engine's combustion section 230. When alternative turbine engines are employed, however, compression relief outlets may be located differently, or an alternate design may be employed. For example, compression relief outlets may not be located around the periphery of the engine, and a lesser or greater number of outlets may be employed. Whatever turbine engine is selected, however, air is removed therefrom by the compression relief system.

In the present embodiment, a specialized manifold 240 is preferably provided to communicate with each of the compression relief outlets 220, such as by way of, for example, rigid or flexible tubing 250. Preferably, the manifold 240 is designed to encircle at least a portion of the turbine engine 30, and is disposed near the combustion section 230 to be in the vicinity of the compression relief outlets 220.

In similar fashion to the compression relief outlets, the manifold may be adapted to best communicate with the particular turbine engine used. Thus, the exact shape, size and location of the manifold may change accordingly.

If an overspeed condition occurs in the present embodiment of the invention, air is transferred from the turbine engine 30 to the manifold 240 through the compression relief outlets 220. The manifold 240 may be adapted to direct the air to, for example, the atmosphere or a collection device, preferably through one or more exhaust lines 260. Preferably, the exhaust line(s) 260 is routed through an electronic valve 270, such that the pathway to the atmosphere is restricted unless an overspeed condition occurs. An electronic valve from the Parker Hannifin Corporation in Cleveland, Ohio may be used for this purpose, although other electronic valves may also be successfully employed.

Preferably, the air is removed from the turbine engine 30 just prior to entering the combustion section 230 thereof. At this stage, the air has passed through the compressor section of the turbine engine 30, but has not yet mixed with fuel. The compression relief system 210 is activated by the gas turbine electric powerplant's control software, in response to a signal from one or more sensors provided to detect an overspeed (runaway) condition.

An air directing system 280, or inlet guide vane (IGV) control system is also provided to work in conjunction with the compression relief system 210. The air directing system 280 is adapted to control the angle at which air entering the turbine engine 30 impinges the engine's compressor blades. More specifically, the air directing system 280 is preferably adapted to control the angle at which the air impinges the first set of the turbine engine's compressor blades. The air directing system 280 preferably uses an electromechanical actuator 290 to dictate the angle at which the air flow contacts the compressor blades. The electromechanical actuator 290 is connected to an adjusting rod 300. The adjusting rod 300 enters the turbine engine 30, and is physically connected to the inlet guide vanes 310 of the compressor section 320. When an overspeed condition is detected by the control software, a signal is sent to the electromechanical actuator 290 that results in movement of the adjusting rod 300, and a corresponding de-optimization of the angle that air entering the turbine engine 30 impinges the engine's compressor blades. The result of this adjustment is a reduction in compressor speed and, therefore, a slowdown of the turbine engine 30.

A microprocessor based control system is used to manage the operation of the gas turbine electric powerplant 10. Preferably, the control system is PC-based. The control system receives inputs from a multitude of sensors positioned at various locations throughout the gas turbine electric powerplant. Sensors are provided to report on, for example, turbine speed, turbine engine exhaust gas temperature, turbine engine inlet temperature, gearbox output shaft speed, generator output voltage, gearbox oil pressure and temperature, turbine engine oil temperature, fuel flow rate, and inlet guide vane position.

The control system operates in real time. The control system of the present invention dispenses with the need to utilize relays, timers, or other control hardware. Rather, the control system software replaces the control hardware and directly reads the inputs, calculates the control actions, and writes the outputs. The control system may also provide predictive modeling to allow the fastest and most accurate calculation and attainment of operation set points.

The operator of the gas turbine electric powerplant preferably communicates with the control system via an operator interface. Gas turbine electric powerplant conditions can preferably be monitored by reference to a CRT screen portion of the operator interface. The operator can preferably enter lab data, set data, set points, outputs, and controller modes, and may acknowledge alarms, and perform multiple other tasks from a keyboard or from a touch screen. Several views are preferably available that enable the operator to monitor various aspects of the gas turbine electric powerplant.

Although the present application describes with particularity an electric powerplant having an electric generator driven by a gas turbine engine, it should be realized that the gas turbine engine, control system, and other components of the present invention, could also be used to drive and control other devices. For example, the generator may be replaced with a compressor or a pump. In this manner, high-capacity, portable, compressor or pump systems may be created. Such systems may be used, for example, to drive natural gas through pipelines, or to pump liquids, such as oil or water. Such systems may be especially useful in remote locations, or at temporary sites, where assembling and installing permanent equipment is difficult or undesirable.

The present invention gas turbine electric powerplant provides for a source of electrical power that can be used in a variety of locations and situations to provide both short-term and long-term electrical energy. It is to be understood that the particular embodiment of the gas turbine electric powerplant described herein is provided for purposes of illustration and not limitation, and other embodiments may be possible. As such, the scope of the invention is not to be considered limited by the above disclosure, and modifications are possible without departing from the spirit of the invention as evidenced by the following claims:

What is claimed is:

1. A gas turbine electric powerplant, comprising:
   an aeroderivative gas turbine engine;
   an engine mounting system having a mounting frame designed to floatingly support said gas turbine engine therein, said mounting system designed to compensate for the effects of thermal expansion and/or vibration on engine position;
   a speed reducer for reducing the output speed of said gas turbine engine;
   an electric generator driven by said gas turbine engine;
   a fuel valve for metering a supply of fuel to said gas turbine engine;
   a cooling system for providing cooling fluid to at least said gas turbine engine;
   a turbine engine overspeed control system, said system adapted to slow or shut down said gas turbine engine upon detection of an overspeed condition thereof;
   sensors placed at various locations on said gas turbine electric powerplant, said sensors for monitoring and reporting on a plurality of input, output, and/or component conditions; and
   a microprocessor-based control system for receiving signals from said sensors and controlling said gas turbine electric powerplant, said microprocessor-based control system further adapted to detect an overspeed condition of said gas turbine engine and to activate said turbine engine overspeed control system in response thereto.

2. The gas turbine electric powerplant of claim 1, further comprising a transportable mounting base for receiving the components comprising said gas turbine electric powerplant.

3. The gas turbine electric powerplant of claim 1, wherein the components comprising said gas turbine electric powerplant are mounted to a fixed surface.

4. The gas turbine electric powerplant of claim 1, wherein said engine mounting system employs a mounting frame associated with a plurality of mounting shafts and mounting shaft receiving linear bearings that allow said gas turbine engine to effectively float within said mounting frame in order to compensate for thermal expansion and/or vibration.

5. The gas turbine electric powerplant of claim 1, wherein said gas turbine engine operates on a liquid fuel selected from the group consisting of gasoline, diesel fuel, jet fuel, kerosene and isopropyl alcohol.

6. The gas turbine electric powerplant of claim 1, wherein said gas turbine engine operates on a gaseous fuel selected from the group consisting of hydrogen, natural gas, propane, isopropane and butane.

7. The gas turbine electric powerplant of claim 1, wherein said fuel valve has an integrated microprocessor in electrical communication with said microprocessor-based control system.

8. The gas turbine electric powerplant of claim 1, wherein said turbine engine overspeed control system includes a compression relief system, said compression relief system adapted, upon occurrence of an overspeed condition of said gas turbine engine, to draw operating air away from a combustion section of said gas turbine engine, and to direct said air to the atmosphere or to a collecting device.

9. The gas turbine electric powerplant of claim 1, wherein said turbine engine overspeed control system includes an air directing system, said air directing system adapted, upon occurrence of an overspeed condition of said gas turbine engine, to de-optimize an angle at which air enters a compressor section of said gas turbine engine.

10. The gas turbine electric powerplant of claim 1, wherein the conditions monitored by said sensors are selected from the group consisting of turbine speed, turbine engine exhaust gas temperature, turbine engine inlet temperature, turbine engine oil temperature and pressure, speed reducer oil temperature and pressure, speed reducer rotational velocity, generator output voltage, fuel flow rate, and inlet guide vane position.

11. The gas turbine electric powerplant of claim 1, further comprising an alternator driven by said gas turbine engine and provided to power one or more electrical energy consuming devices.

12. The gas turbine electric powerplant of claim 1, wherein said speed reducer reduces the output speed of said gas turbine engine to about 1,800 revolutions per minute.

13. The gas turbine electric powerplant of claim 1, wherein said electric generator produces approximately 1.2 MW of power.

14. A gas turbine electric powerplant, comprising:
an aeroderivative gas turbine engine;
an engine mounting system for affixing said gas turbine engine to a mounting surface, said engine mounting system designed to allow said gas turbine engine to effectively float within a mounting frame in order to compensate for the effects of thermal expansion and/or vibration on engine position;
a speed reducer for reducing the output speed of said gas turbine engine;
an electric generator driven by said gas turbine engine;
a fuel valve for metering a supply of fuel to said gas turbine engine;
a cooling system for providing cooling fluid to at least said gas turbine engine, said cooling system associated with at least one cooling pump and at least one cooling fluid reservoir;
an alternator driven by said gas turbine engine for powering at least one electrical energy consuming device associated with said gas turbine electric powerplant;
a turbine engine overspeed control system, said overspeed control system adapted to slow or shut down said gas turbine engine upon detection of an overspeed condition thereof by removing operating air from said turbine engine prior to its combustion;
sensors placed at various locations on said gas turbine electric powerplant, said sensors for monitoring and reporting on a plurality of conditions selected from the group consisting of turbine speed, turbine engine exhaust gas temperature, turbine engine inlet temperature, turbine engine oil temperature and pressure, speed reducer oil temperature and pressure, speed reducer rotational velocity, generator output voltage, fuel flow rate, and inlet guide vane position; and
a microprocessor-based control system for receiving signals from said sensors and controlling said gas turbine electric powerplant, said microprocessor-based control system further adapted to detect an overspeed condition of said gas turbine engine and to activate said turbine engine overspeed control system in response thereto.

15. The gas turbine electric powerplant of claim 14, further comprising a transportable mounting base for receiving the components comprising said gas turbine electric powerplant.

16. The gas turbine electric powerplant of claim 14, wherein said engine mounting system employs a plurality of mounting shafts and mounting shaft receiving linear bearings.

17. The gas turbine electric powerplant of claim 14, wherein said gas turbine engine operates on a fuel selected from the group consisting of gasoline, diesel fuel, jet fuel, kerosene, isopropyl alcohol, hydrogen, natural gas, propane, isopropane, and butane.

18. The gas turbine electric powerplant of claim 14, wherein said turbine engine overspeed control system includes a compression relief system, said compression relief system adapted, upon occurrence of an overspeed condition of said gas turbine engine, to draw operating air away from a combustion section of said gas turbine engine, and to direct said air to the atmosphere or to a collecting device.

19. The gas turbine electric powerplant of claim 14, wherein said turbine engine overspeed control system includes an air directing system, said air directing system adapted, upon occurrence of an overspeed condition of said gas turbine engine, to de-optimize an angle at which air enters a compressor section of said gas turbine engine.

20. The gas turbine electric powerplant of claim 14, wherein said electric generator produces approximately 1.2 MW of power.

21. A transportable gas turbine electric powerplant, comprising:
a common base for receiving the components comprising said gas turbine electric powerplant;
an aeroderivative gas turbine engine;
an engine mounting system for affixing said gas turbine engine to said common base, said engine mounting system including a mounting frame associated with a plurality of mounting shafts and mounting shaft receiving linear bearings that allow said gas turbine engine to effectively float within said mounting frame in order to compensate for the effects of thermal expansion and/or vibration on the position of said gas turbine engine;

a speed reducer associated with said gas turbine engine, said speed reducer adapted to reduce the rotational speed of an output shaft of said gas turbine engine;

a permanent magnet generator coupled to said speed reducer, said generator adapted to provide at least 1.0 MW of 3-phase, 480 volt AC power;

a fuel valve for metering a supply of fuel to said gas turbine engine;

a cooling system for providing cooling fluid to at least said gas turbine engine, said cooling system associated with at least one cooling pump and at least one cooling fluid reservoir;

an alternator driven by said gas turbine engine for powering at least one electrical energy consuming device associated with said gas turbine electric powerplant;

a turbine engine overspeed control system, said overspeed control system including a compression relief system adapted to rapidly draw air away from an inlet portion of a combustion section of said gas turbine engine upon detection of an overspeed condition thereof, and an air directing system adapted to de-optimize an angle at which air impinges a set of inlet guide vanes located approximate a first stage of a compressor section of said gas turbine engine upon detection of an overspeed condition thereof;

sensors placed at various locations on said gas turbine electric powerplant, said sensors for monitoring and reporting on a plurality of conditions selected from the group consisting of turbine speed, turbine engine exhaust gas temperature, turbine engine inlet temperature, turbine engine oil temperature and pressure, speed reducer oil temperature and pressure, speed reducer rotational velocity, generator output voltage, fuel flow rate, and inlet guide vane position; and a microprocessor-based control system for receiving signals from said sensors and controlling said gas turbine electric powerplant, said microprocessor-based control system further adapted to detect an overspeed condition of said gas turbine engine and to activate said overspeed control system in response thereto.

22. The transportable gas turbine electric powerplant of claim 21, further comprising an operator interface for interacting with said microprocessor-based control system.

* * * * *

UNITED STATES PATENT AND TRADEMARK OFFICE
CERTIFICATE OF CORRECTION

| | | |
|---|---|---|
| PATENT NO. | : 7,461,510 B1 | |
| APPLICATION NO. | : 11/380439 | |
| DATED | : December 9, 2008 | |
| INVENTOR(S) | : Munson, Jr. | |

It is certified that error appears in the above-identified patent and that said Letters Patent is hereby corrected as shown below:

On the Title Page Item (74), please delete "Standly" and insert -- Standley --.

In column 6, line 12, please delete "40".

In column 6, lines 32 through 41, please delete "While numerous gearboxes may be used to accomplish the necessary speed reduction, the gearbox 90 used in this particular embodiment of the gas turbine electric powerplant 10 is manufactured by the Cotta Transmission Company, in Beloit, Wis. The Cotta gearbox 90 is actually designed to provide a speed increase, but is operated in reverse in this case to provide the necessary speed reduction. It is also possible to couple a variable speed gearbox to the output shaft of the turbine engine 30, whereby variable speed reductions thereof may be achieved.".

Signed and Sealed this

Seventeenth Day of February, 2009

JOHN DOLL
*Acting Director of the United States Patent and Trademark Office*